United States Patent Office 3,433,833
Patented Mar. 18, 1969

3,433,833
SUBSTITUTED BENZANILIDE
Gerhard Satzinger, Gundelfingen, Freiburg, Germany, assignor to Warner-Lambert Pharmaceutical Company, Morris Plains, N.J., a corporation of Delaware
No Drawing. Filed July 5, 1966, Ser. No. 562,486
Claims priority, application Germany, July 12, 1965, G 44,139
U.S. Cl. 260—558
Int. Cl. C07c 103/20, 103/30
1 Claim

ABSTRACT OF THE DISCLOSURE

The novel compound 2-amino-4'-(diethylamino)-2'-methyl-benzanilide which is useful as an anticonvulsant.

---

The present invention relates to the novel compound 2-amino-4'-(diethylamino)-2'-methyl-benzanilide of the following structural formula:

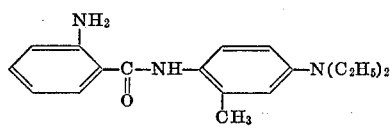

to a process for its preparation and to the therapeutic uses of this compound. This compound exhibits unusual pharmacological properties. As will be pointed out below, this compound is distinguished for its outstanding ability to protect against metrazol induced convulsions as well as convulsions induced by the application of electroshock treatments. Up to the present there has been no available known compound of comparable toxicity which affords protection to a similar degree against both types of induced convulsions. The novel compound of the present invention is, accordingly, useful as an anticonvulsant and is equally effective against epileptic seizures not only in cases of petit mal but in cases of grand mal as well.

An effective daily dose of this compound is of the order of about 200 mg. per dose administered orally 6 times daily. It may also be administered parenterally. The dose can be varied so long as effective blood levels are achieved. A blood level of 1 gamma/ml. in mice and 3 gamma/ml. in humans has been found to produce readily observable pharmacological activity. Human urine levels resulting from this dose level have been observed to be about 25 gamma/ml.

The novel compound of this invention can be obtained by reacting 2-amino-5-diethylamino-toluene with isatoic acid anhydride in accordance with the following reaction:

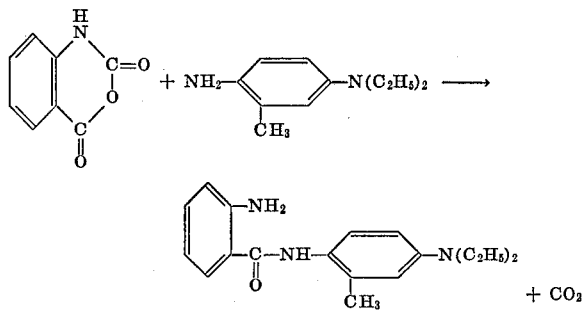

A more detailed description of the preparation of the novel compound of this invention is found in the following:

EXAMPLE 0.8 kg. (4.5 mols) of freshly distilled 2-amino-5-diethylamino-toluene is mixed thoroughly with 0.75 kg. (4.5 mols) of isatoic acid anhydride and the mixture heated to 100° C. with stirring for three hours. The product formed is taken up before cooling in 2.5 liters of boiling ethyl acetate and the solution filtered. On cooling the filtrate 1.1 kg. (83% of theory) of 2-amino-4'-(di-ethylamino)-2'-methyl-benzanilide precipitates out. After recrystallization from n-propanel the colorless crystalline product obtained melts at 152° C. The elemental analysis of the product is as follows:

Analysis (in percent).—Calculated: C, 72.69; 1.+, 7.80; N, 14.13; O, 5.38. Found: C, 72.68; 1+, 7.53; N, 14.20; O, 5.72

This compound is somewhat basic and forms various nontoxic pharmaceutically acceptable acid addition salts including a water-soluble hydrochloride.

The acute oral toxicity or oral $LD_{50}$ of the compound of this invention in mice was determined by the method of Behrens and Kaerber and found to be greater than 5,000 mg./kg., a toxicity which compares very favorably to the well-known anti-convulsant "Tridione," which is 3,5,5-trimethyl-2,4-oxazolidinedione or trimethadione and whose oral $LD_{50}$ is 2,000 mg./kg. determined by the same method. The oral $LD_{50}$ is determined by administering increasing doses of the test compound to a series of groups of four male white mice by means of a stomach tube and observing the treated mice for 24 hours. The oral $LD_{50}$ is that dose which is lethal to half of the test mice in the 24 hour period. The higher the $LD_{50}$, the lower the acute toxicity of the compound. By the subcutaneous administration route, the $LD_{50}$ in mice was found to be about 1,000 mg./kg.

The lack of toxicity of the compound of this invention was established over a thirty day test period.

The anticonvulsant activity of the compound of this invention was determined by test procedures carried out with male white mice of an average weight of 18–22 grams. The test methods employed involved the determination of the degree of protection afforded against experimentally induced convulsions produced by electroshock treatment and by the subcutaneous administration of Metrazol (pentylenetetrazol).

The procedure employed involves the intragastric administration of varying doses of 2-amino-4'-(diethylamino)-2'-methyl-benzanilide and of trimethadione to groups of 12 animals. Thirty minutes after administration of the respective doses the animals were subject to electroshock treatment applying 20 ma. (milliamperes) for 0.2 seconds employing cranial electrodes and counting the number of animals in which extensor spasm convulsions are induced by this electroshock stimulus.

The results observed are summarized in the following table:

| Dosage, mg/kg. | Number of mice exhibiting extensor spasm convulsions | |
|---|---|---|
| | Test compound | Trimethadione |
| 50 | 11 | 12 |
| 75 | 10 | 12 |
| 100 | 4 | 12 |
| 125 | 4 | 12 |
| 150 | 0 | 12 |
| 200 | 1 | 12 |
| 250 | 2 | 10 |
| 300 | 1 | 12 |

The observed results clearly indicate that at a dose of 300 mg./kg. intragastrically, trimethadione provides no protection whatever against electroshock induced extensor spasm convulsions while the novel test compound, 2-amino-4'-(diethylamino)-2'-methyl-benzanilide, surprisingly enough, exhibits maximum protection at a dose of only 150 mg./kg.

The administration of a gum tragacanth mucilage is employed as a control. The administration of the same electroshock to the control mice resulted in death to half of the test mice employed.

Employing a test method where the therapeutic agent is administered at various dose levels to groups of 12 mice and then 30 minutes later 120 mg./kg. of metrazol is administered subcutaneously to produce extensor spasm convulsions, the degree of protection induced by the test compound compared to trimethadione is summarized in the following table:

| Dosage, mg/kg. | Number of mice exhibiting extensor spasm convulsions | |
| --- | --- | --- |
| | Test compound | Trimethadione |
| 50 | 5 | 12 |
| 100 | 1 | 10 |
| 150 | 0.5 | 10 |
| 200 | 0.5 | 5 |
| 250 | 1 | 8 |
| 300 | 0 | 0 |

In this instance also a gum tragacanth mucilage was administered as control to groups of 12 mice and the convulsion inducing subcutaneous dose of metrazol of 120 mg./kg. which was employed caused death in all of the control mice.

The above results clearly indicate that the protective effect of trimethadione, which is a clinically established anticonvulsant, was observed only when the dose reached 300 mg./kg. whereas the novel test compound 2-amino-4'-(diethylamino)-2'-methyl-benzanilide was entirely effective in protecting against at a dose of 150 mg./kg. The novel compound of this invention is also effective in protecting against strychnine induced spasm.

Electroencephalographic measurements in epileptics indicate a distinct lowering of spasm potential, in one case from a typical spasm potential every 16 seconds to one potential every 84 seconds after administration of a dose of 200 mg. of the active compound.

It is understood that the foregoing detailed description is given merely by way of illustration and that many variations may be made therein without departing from the spirit of my invention.

Having described my invention, what I desire to secure by Letters Patent is:

I claim:
1. The compound 2-amino-4'-(diethylamino)-2'-methyl-benzanilide and its nontoxic pharmaceutically acceptable acid addition salts.

References Cited

Clark et al., J. Org. Chem., vol. 18 pp. 55–63 (1943).

HENRY R. JILES, *Primary Examiner.*

HARRY I. MOATZ, *Assistant Examiner.*

U.S. Cl. X.R.

260—577; 424—324